United States Patent

[11] 3,566,798

| [72] | Inventor | Herbert G. Peitzman<br>Des Moines, Iowa (P. O. Box 12, Johnston, Iowa 50131) |
|---|---|---|
| [21] | Appl. No. | 797,750 |
| [22] | Filed | Feb. 10, 1969 |
| [45] | Patented | Mar. 2, 1971 |

[54] AUTOMOBILE TURNTABLE
1 Claim, 3 Drawing Figs.

[52] U.S. Cl. .................................................. 104/44, 104/46
[51] Int. Cl. ...................................................... B60s 13/02
[50] Field of Search............................................ 104/35, 36, 38, 43, 44

[56] References Cited
UNITED STATES PATENTS

| 1,378,898 | 5/1921 | Potts ............................ | 104/36 |
| 1,385,852 | 7/1921 | Troutman..................... | 104/38 |

*Primary Examiner*—Arthur L. La Point
*Assistant Examiner*—D. W. Keen

ABSTRACT: A turntable for an automobile driveway of limited width so as to permit a vehicle to run around for forward travel along the driveway, the turntable including a mechanism for rotating the same.

Patented March 2, 1971 3,566,798

INVENTOR
HERBERT G. PEITZMAN

AUTOMOBILE TURNTABLE

This invention relates generally to automobile driveways. More specifically, it relates to automobile turning mechanisms.

It is generally well known to most persons, particularly in congested and crowded urban areas that driveways are usually made relatively narrow and do not allow sufficient room for a car to make a broken U-turn so that the same may be turned around and allow to drive in a forwardly direction between a garage at one end of the driveway and an exit to a street at the opposite end of a driveway.

Accordingly, it is the principle object of the present invention to provide a means whereby a car may be forwardly driven from the street along the driveway into a garage at the end of the driveway and wherein after the car is removed from the garage it can be rotated around so as to drive outwardly back to the street in a forward direction without the need of backing out.

Another object of the present invention is to provide an automobile turntable fitted into a driveway surface adjacent a garage so as to allow an automobile to be rotated into an opposite direction without the necessity of maneuvering a broken U-turn.

Other objects of the present invention are to provide an automobile turntable which is simple in design, inexpensive to manufacture, rugged in construction, easy to use and efficient in operation.

These and other objects will be readily evident upon a study of the following specification and the accompanying drawing wherein.

Figure 1:
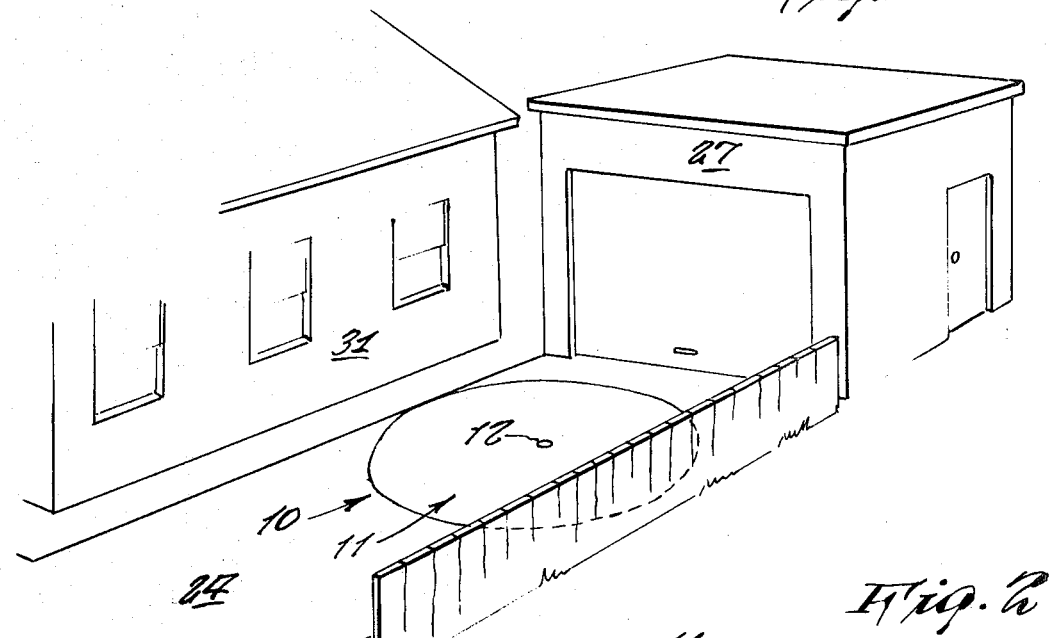
FIG. 1 is a perspective view of the present invention shown mounted within one end of a driveway.
Figure 2:
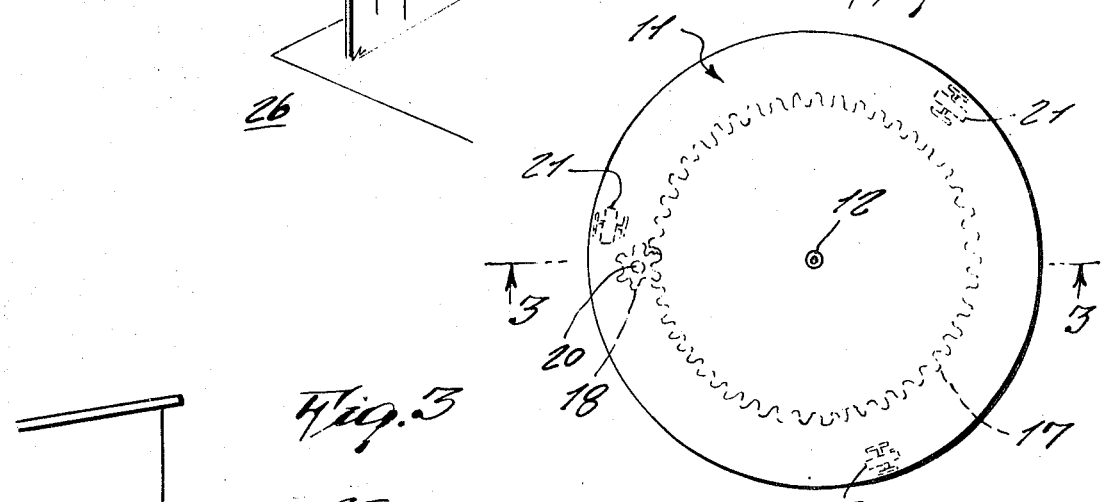
FIG. 2 is a top plan view of the turntable.

Referring now to the drawing in detail, the reference numeral 10 represents an automobile turntable, according to the present invention, wherein there is a circular platform 11 that is centrally pivotable about a post 12 extending downwardly therefrom and into a motor in housing 13 that is electrically driven by means of wire conductors 14.

The platform 11 is mounted upon a plurality of ball bearings 15 located there between and the upper side of a base 16. The underside of the platform and the upper side of the base are each provided with corresponding circular grooves within which the ball bearings 16 may travel.

A gear 17 is integrally formed with the platform 11, the gear 17 toothingly engaging a sprocket 18 mounted upon a shaft 20, the sprocket driving the gear so to cause the platform to rotate upon the ball bearings 16.

The outer periphery of the platform is supported upon a plurality of rollers 21 which ride upon an upper surface 22 of a base 23.

Figure 3:
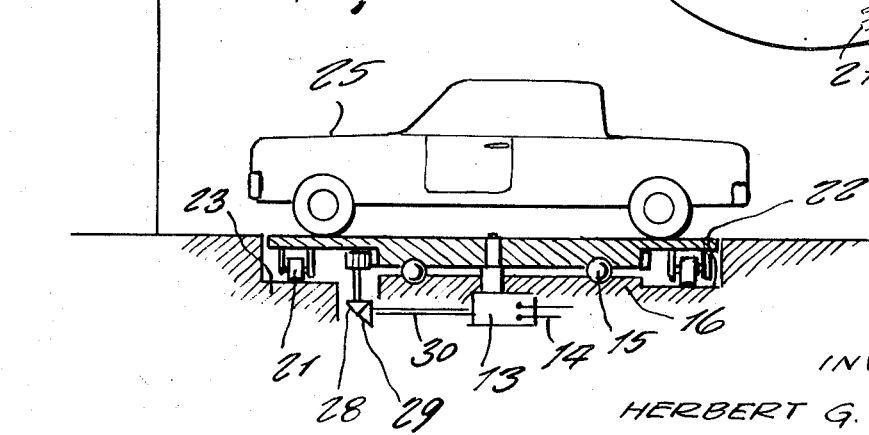
FIG. 3 is a cross-sectional view taken along the line 3-3 of FIG. 2.

As is shown in FIG. 1 and 3 of the drawing, it will be noted that the platform 11 has an upper surface which is flush with the upper surface of a driveway 24 so as to permit an automobile 25 to travel there across.

In operative use, an automobile may enter the driveway 24 from a street 26 by driving forwardly toward the garage 27. It will be noted that the turntable is located directly in front of the garage so that upon leaving the garage, the automobile is in reverse only a relatively short distance which will be sufficient to place it upon the turntable 10. The mechanism is then operated so as to cause the turntable to rotate, thus bringing the car rotationally around 180° whereby the vehicle may now drive out of the driveway in a forwardly direction instead of in reverse.

While various mechanism may be employed for operating the turntable, the present drawing illustrates only schematically one form thereof and the present invention is accordingly not confined to the limits of the mechanical mechanism herewith presented. In the structure presented, the sprocket shaft 20 is shown having a beveled gear 28 mounted thereupon, the bevel gear 28 engaging a bevel gear 29 mounted upon a motor shaft 30 of the motor 13. The present mechanism may include a control panel that is conveniently located, within the house 31, or if preferred, may be centrally positioned within the upper end of the shaft 12 so that either the motorist may operate the same manually, or if preferred be positioned upon the turntable so that the passage of the automotive vehicle thereacross will activate the switch for starting up the motor. In the latter case, the motor will be deactivated as the automotive vehicle leaves the turntable after having been positioned into a proper direction so that the car may leave in a forwardly direction therefrom.

Thus there has been provided an automobile turntable which will be particularly adaptable for driveways wherein a broken U-turn is not readily possible due to lack of space.

I claim:

1. In an automobile turntable, the combination of a circular platform, said circular platform having an upper surface, said upper surface of said circular platform being flush with an upper surface of a driveway so that an automotive vehicle may travel thereacross, and means for rotating said platform whereby said automotive vehicle positioned upon said turntable may be turned around into an opposite direction of travel, said platform being mounted rotatably free upon a plurality of ball bearings on the under side thereof, said ball bearings being supported upon a stationary base, the under side of said platform and the upper side of said base each being provided with a circular groove within which said ball bearings travel, the peripheral area of said platform being supported upon a plurality of rollers, each of said rollers being supported to travel upon a circular track of a base, said platform having a gear integral therewith, said gear being concentric with said platform, said gear being toothingly engaged with a sprocket, and motor means for selectively driving said sprocket, said motor means comprising a sprocket beam upon a shaft carrying a bevel gear which is in engagement with a second bevel gear mounted upon a motor shaft of a motor that is connected to an electric power source by means of wire conductors, said wire conductors being intercepted by switch means for turning on and off said motor, and said platform being pivotable about a centrally positioned vertical shaft mounted on a motor housing of said motor.